May 16, 1967

H. T. BOEKER 3,320,477

POWER SUPPLY HAVING OVER-VOLTAGE AND
OVER-CURRENT PROTECTION MEANS

Filed Aug. 19, 1964

INVENTOR.
HAROLD T. BOEKER
BY *Joseph B Forman*
ATTORNEY

INVENTOR.
HAROLD T. BOEKER
BY Joseph B. Forman
ATTORNEY

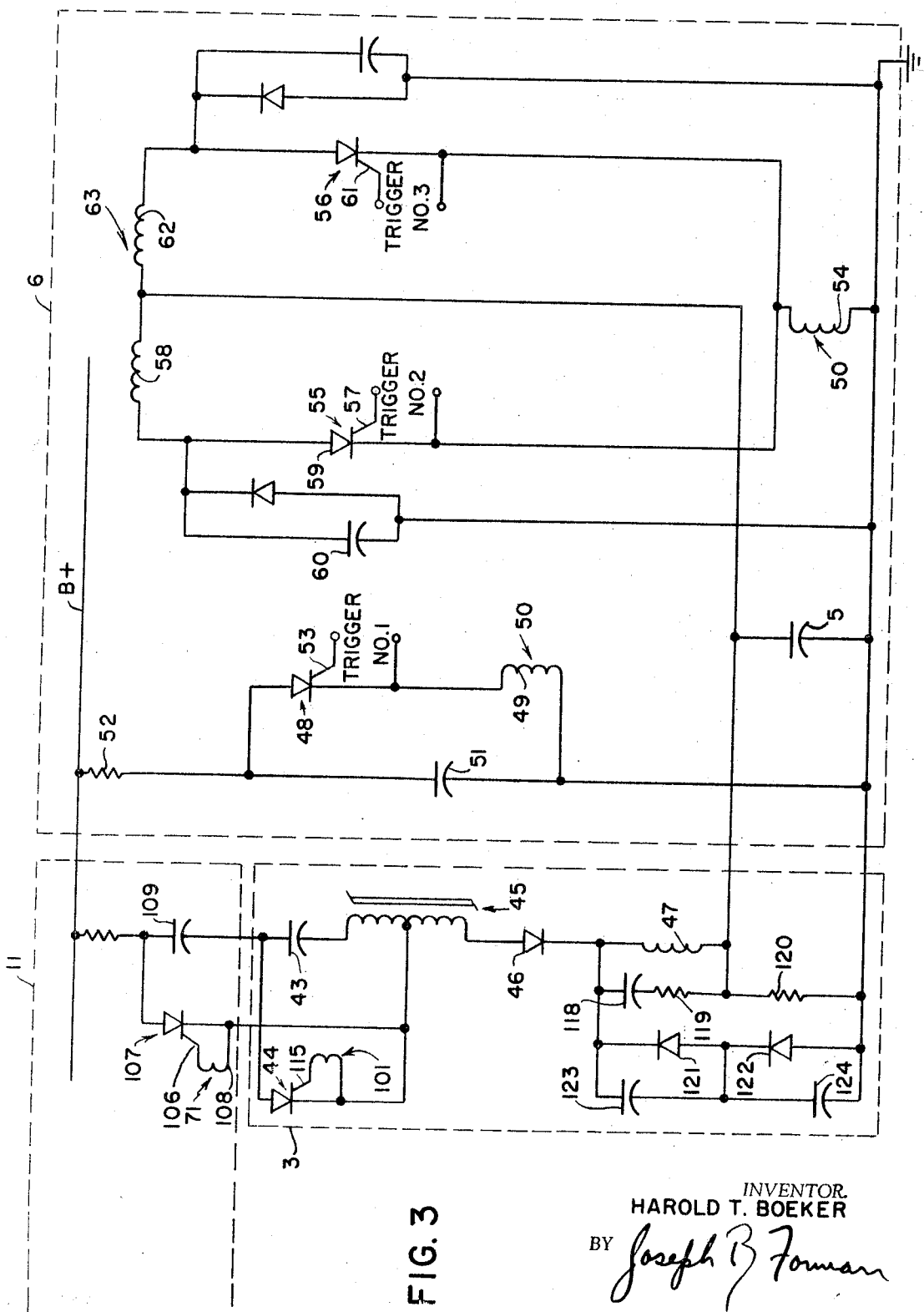

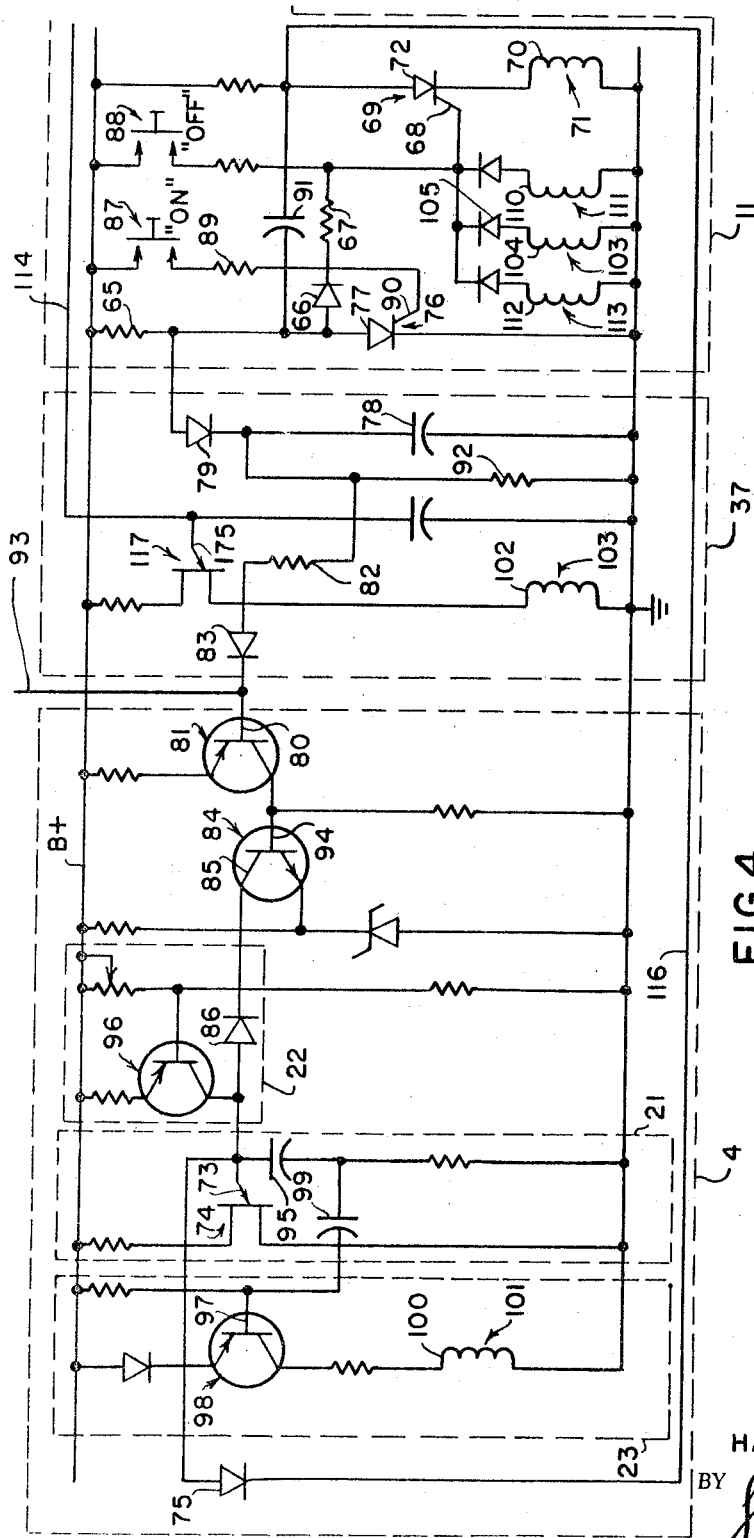

United States Patent Office 3,320,477
Patented May 16, 1967

3,320,477
POWER SUPPLY HAVING OVER-VOLTAGE AND OVER-CURRENT PROTECTION MEANS
Harold T. Boeker, Brookfield, Wis., assignor to General Electric Company, a corporation of New York
Filed Aug. 19, 1964, Ser. No. 390,668
11 Claims. (Cl. 315—307)

This invention relates to an improved power supply for iron core transformers and for coreless resonant transformers which are alternatively used with X-ray tubes and electron beam emitting tubes to provide accelerating voltage for the electrons traversing such tubes.

In general, iron core transformers used for the above indicated purposes have been operated at power line frequency. On the other hand, resonant transformers have been operated at higher frequency in order to reduce the size of the components that are necessary to provide capacitance and inductance for resonance. In iron core transformers a severe problem of insulating the windings from the core is encountered, whereas in the resonant transformer this problem is avoided. Thus, for use with X-ray and electron beam generator tubes, design factors have influenced using iron core transformers for comparatively low voltages such as up to 150 kilovolts and using the resonant transformers for the next range up to 2,000 kilovolts or even higher.

The present invention concerns a power supply that is used with either an iron core transformer or a resonant transformer. However, to avoid repetition and yet explain the principles of the invention, the ensuing description will be directed to the resonant transformer application primarily. The use of a resonant transformer in such applications presents many advantages such as reduction in size and weight, optimum configuration for ultra-high voltage application, and improvement in the voltage output waveshape. Heretofore, resonant transformer control systems typically employed a synchronous motor-generator set to drive the resonant transformer. In such motor-generator control systems, the voltage output was very sensitive to small changes in line frequency due to the high Q characteristic of the resonant transformer. Thus, where the line frequency was not stable, the synchronous motor had to be replaced by an expensive speed controlled motor, in order to achieve a stable output voltage.

Further problems were encountered if such a synchronous motor control was operated from a power source whose frequency was different from that of the resonant transformer. In such a case it became necessary to employ a chain or gear control drive in the motor generator set in order to match the line frequency to the resonant transformer frequency.

The present invention presents an important advantage over the electromechanical control systems heretofore employed by eliminating the use of these large and complex mechanical frequency matching devices and hence avoiding the inaccuracies inherent therein. This is made possible by employing a stable reference oscillator to control the frequency of the voltage applied to drive the resonant transformer. Since the frequency of the reference oscillator output may be controllably varied with ease, such a control system is operative, without further modification, over a wide range of resonant frequencies. In addition, since the reference oscillator output frequency is independent of the line frequency, it will be virtually unaffected by fluctuations therein.

Accordingly, it is an important object of this invention to provide an improved power supply control system which is operative over a wide range of power source frequencies and immune to frequency variations in said power source.

To achieve high efficiency of operation of X-ray or electron beam generator apparatus, it is necessary that the power supply frequency be accurately matched to that of the resonant transformer. Heretofore, in constructing a resonant transformer to have a particular resonant frequency, it was almost always necessary to rebuild the transformer several times by a "cut and try" method in order to obtain the desired resonant frequency with sufficient accuracy.

Accordingly, it is another object of this invention to provide an improved resonant transformer power supply which may be easily and accurately matched to a resonant transformer of a given resonant frequency.

The motor-generator control apparatus used in the past comprised large electromechanical components which contributed to its large size and weight. As a result, the original cost of the apparatus was high and the power consumed in its operation was substantial.

It is, accordingly, another object of this invention to provide a compact, low weight, efficient and reliable resonant transformer power supply utilizing solid state devices, thereby effecting substantial economy in original and operating costs.

In motor-generator control apparatus, a relay and amplistat control is usually employed to provide circuit protection in the event of over-voltage or overload current. This type of protective overload control, however, is operative to remove the supply of power to the resonant transformer only after an interval of at least several cycles following the occurrence of the overload.

It is accordingly a further object of this invention to provide circuit protection apparatus operative to interrupt the supply of power to a resonant transformer in midcycle.

Briefly stated and in accordance with the invention, in one embodiment thereof, a D.C. to D.C. converter is connected at its input to a source of D.C. potential to provide a selectively variable D.C. potential at its output. The selectively variable D.C. potential thus produced serves as the D.C. supply voltage for an inverter which produces driving pulses for a resonant transformer at a frequency controlled by a reference frequency oscillator. A voltage regulator is provided which samples the amplitude of the resonant transformer output voltage and produces voltage control pulses at a rate determined by the deviation of said output voltage from a preselected level. The voltage control pulses are applied to the D.C. to D.C. converter to control its selectively variable output voltage and thereby control the resonant transformer output voltage. The output voltage of the resonant transformer is applied to the accelerating electrodes of an electron tube having an emitting electrode and accelerating electrodes. A current regulator controls the repetition rate of the pulses of current flowing through said emitting electrode in accordance with the deviation of the tube current from a preselected level, to thereby control the tube current. Circuit protection means is provided to interrupt the supply of power to the resonant transformer in mid-cycle whenever the D.C. to D.C. converter voltage or current output, or resonant transformer voltage or current output exceeds predetermined levels.

The novel features of the invention are set forth with particularity in the appended claims. The invention itself, however, both as to its organization and method of operation, together with further objects and advantages thereof, may be best understood by referring to the following description and accompanying drawings.

In the drawings, FIG. 1 is a simplified block diagram of an illustrative embodiment of the invention;

FIG. 3 is a schematic circuit showing the chopper, inverter, storage capacitor and part of the circuit breaker portions of the illustrative embodiment shown in FIG. 2;

FIG. 4 is a schematic circuit showing the voltage regulator, voltage overload sensor and part of the circuit breaker portions of the illustrative embodiment shown in FIG. 2.

Figure 1:
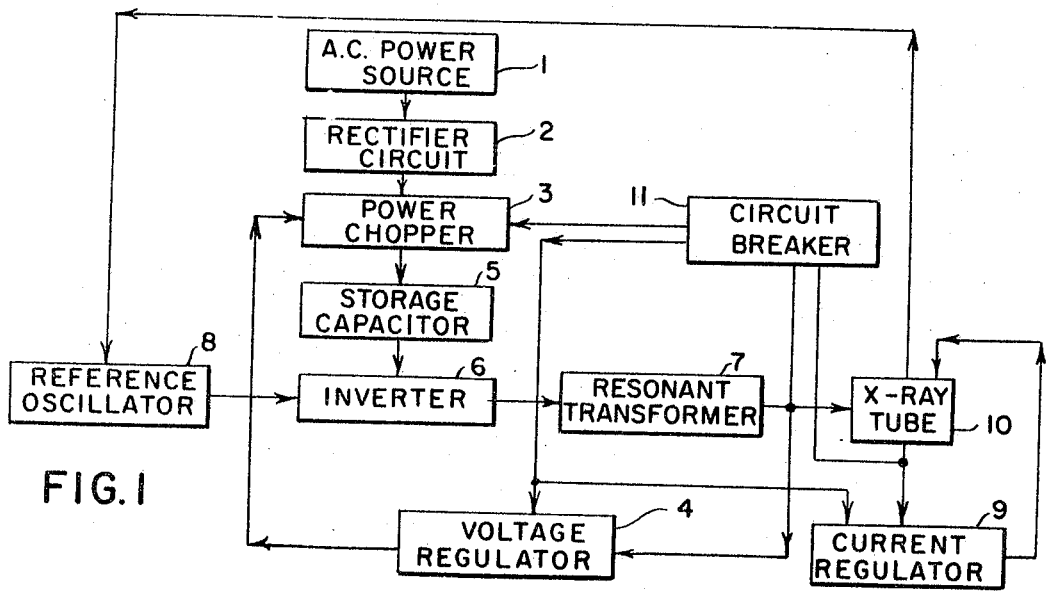

Referring to FIG. 1, the output of an A.C. power source 1, which is typically three phase, although it may be single phase or utilize any known multiple phase system, is rectified and filtered by a rectifier circuit 2 to produce a D.C. voltage which is applied to a power chopper 3. This applied D.C. voltage is chopped, by chopper 3, into pulses having a fixed width and a variable repetition frequency which is determined by the frequency of control pulses applied thereto by a voltage regulator 4. The pulses provided by chopper 3 are applied to a storage capacitor 5, the value of the D.C. voltage thereby produced thereacross being determined by the repetition frequency of pulse input thereto. The repetition frequency of the pulses provided by voltage regulator 4 is controllably variable and, therefore, the D.C. voltage produced across the output of capacitor 5 will likewise be controllably variable. Capacitor 5 thus serves as a source of controllably variable D.C. potential for an inverter 6 which is operative to provide square wave voltage pulses for each half of the center-tapped primary winding of a resonant transformer 7 to provide the accelerating voltage for an X-ray tube 10. It is understood that an electron beam tube or a tube of a similar type may be substituted for X-ray tube 10 without requiring any significant modification in the accompanying circuitry. For example, the electron beam tube is similar to an X-ray tube with the exception that the tungsten target of the X-ray tube is replaced by a titanium window which permits the transmission of electrons therethrough. In the following description, therefore, references made to X-ray tube 10 are intended to include tubes of a similar kind such as an electron beam tube. The operating frequency of inverter 6 is controlled by the frequency of a reference oscillator 8 whose frequency is locked to the resonant frequency of transformer 7 by a feedback synchronizing signal provided by a capacitor voltage divider (not shown).

Voltage regulator 4 is operative to determine the output voltage of resonant transformer 7 and to control the repitition rate of chopper 3 in accordance with the deviation of said output voltage from a preselected level.

A current regulator 9 is operative to provide pulses of current to the filament of X-ray tube 10 at a controllably variable frequency determined by the deviation of the tube current from a preselected level and may be of the type disclosed in patent application by Harold T. Boeker, Ser. No. 389,598, filed Aug. 14, 1964, for a Current Control and assigned to the same assignee herein.

A solid state circuit breaker 11 is provided to protect against excessive resonant transformer output voltage, overload tube current, excessive D.C. voltage being applied to inverter 6, such as may occur if the feedback loop of voltage regulator 4 is opened, and short circuit protection for chopper 3 if inverter 6 should not commutate. In an X-ray application, circuit breaker 11 may also be connected to an interval timer (not shown) to control the duration of X-ray exposure.

Figure 2:
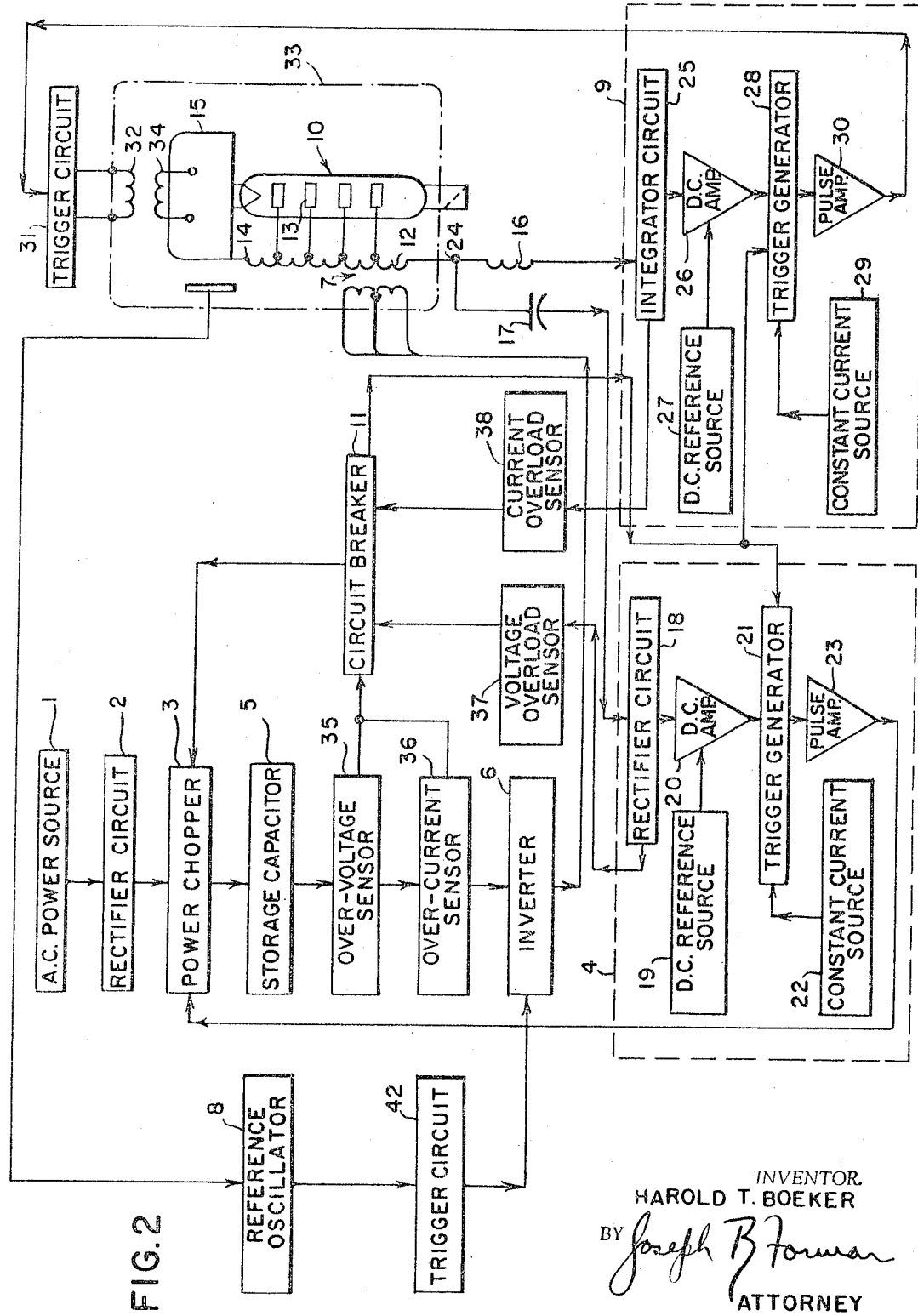
FIG. 2 is a detailed block diagram of the embodiment shown in FIG. 1.

Reference is made to FIG. 2 which is a more detailed block diagram illustrating a typical X-ray power supply embodying the invention. Secondary winding 12 of resonant transformer 7 may be constructed from circular pancake coils each having a hole in the center thereof, and may be stacked to provide a cylindrical opening in which X-ray tube 10 may be installed. Accelerating electrodes 13 are tapped into secondary winding 12 to provide the required voltages for the accelerating electrodes. One end 24 of winding 12 is held at ground potential while the other end 14 swings from positive high voltage, e.g., 2000 kvp., to negative high voltage. High voltage end 14 is terminated by an electrostatic shield 15 which contains the filament power control apparatus (not shown) which may be of the type disclosed in patent application by Harold T. Boeker, Ser. No. 389,598, filed Aug. 14, 1964, for a Current Control and assigned to the same assignee herein.

The voltage applied to X-ray tube 10 is controlled in the following manner. A filter network comprising an inductance 16 and a capacitance 17 separates the A.C. circulating current component from the D.C. tube current component which is present due to the self-rectifying action of X-ray tube 10. The A.C. circulating current flows through capacitor 17 and is rectified and integrated by a rectifier circuit 18 producing a D.C. voltage which is proportional to the output voltage appearing across winding 12. This D.C. voltage is compared in a D.C. amplifier 20 with a voltage provided by a D.C. reference voltage source 19 representing the desired level of output voltage. The voltage difference therebetween is amplified by amplifier 20 to produce a D.C. error signal. This error signal is applied to a trigger generator 21 to control the repetition frequency of the voltage control pulse output thereof in accordance with the magnitude of the error signal. Thus, for example, if the resonant transformer output voltage exceeds the desired level, the magitude of the D.C. error signal will increase, to correspondingly decrease the repetition frequency of the pulse output of generator 21. A source of constant current 22 is employed to provide for linear capacitor charging in trigger generator 21 to thereby improve the triggering stability of trigger generator 21, particularly at low repetition rates. The voltage control pulses produced by trigger generator 21 are amplified by pulse amplifier 23 and are thereafter applied to power chopper 3 to control the operating frequency thereof. In this way, voltage regulator 4 is operative to respectively increase or decrease the pulse repetition frequency of chopper 3 as the resonant transformer output voltage drops below or rises above the desired level. This feedback action maintains the resonant transformer output voltage substantially constant.

Current regulator 9 is operative to regulate the tube current in the following manner. Due to the self-rectifying action of X-ray tube 10 when conducting, pulses of tube current will appear in the ground potential end 24 of secondary winding 12. This current flowing through a resistor-capacitor integrator circuit 25 produces a D.C. voltage thereacross whose magnitude is proportional to the magnitude of the tube current. A preselected portion of the voltage thus produced is compared in a D.C. amplifier 26 with a voltage provided by a D.C. reference source 27 representing a desired level of tube current. The D.C. error voltage thereby produced is amplified and applied to a trigger generator 28 by amplifier 26, to thereby control the repetition frequency of the pulse output of trigger generator 28. For example, if the tube current exceeds the desired level, the error signal produced by amplifier 26 will increase in magnitude to correspondingly decrease the repetition frequency of the pulse output of trigger generator 28. A source of constant current 29 is employed to provide for linear charging of the timing capacitor (not shown) in trigger generator 28, to improve the triggering stability thereof, particularly at low repetition frequencies. The output of trigger generator 28 is amplified by a pulse amplifier 30 and thus amplified, is applied to a trigger circuit 31 which produces a pulse of current through a coil 32 for each trigger pulse produced by trigger generator 28. The pulse of current through coil 32, which is located just inside the wall of a pressure vessel 33, produces a magnetic flux field to link a pick-up coil 34 located within shield 15. The time varying magnetic field thus produced, generates a voltage in coil 34 which is suitably applied to the filament power control circuit (not shown). This power control circuit is operative to deliver a pulse of current having a fixed pulse width for each gating pulse applied thereto at pick-up coil 34. Thus, as the repetition frequency of the gating pulses, thus applied, is increased, more power is delivered to the X-ray tube filament causing the tube current to increase accordingly. Current regulator 9 maintains the value of the tube current constant at the preselected level by increasing or decreasing the repetition frequency of the trigger pulses produced by trigger generator 28, as the X-ray tube current drops below or rises above the preselected level, respectively.

Circuit breaker 11 is operative in response to trip signals provided by sensors 35 and 36 which detect an excess in the supply of voltage or current to inverter 6, and by sensors 37 and 38 which detect X-ray tube voltage and current overloads, respectively. When a trip signal is applied thereto, circuit breaker 11 clamps the pulse output of trigger generators 21 and 28, while concurrently opening the circuit path between rectifier circuit 2 and inverter 6. This action serves to interrupt the supply of power from inverter 6 to resonant transformer 7.

*Chopper 3 and inverter 6*

Referring now to FIG. 3, the principles of operation of chopper 3 and inverter 6 will be described in more detail.

The controllably variable D.C. potential to be applied to inverter 6 is produced across storage capacitor 5 by the action of chopper 3. The circuitry of chopper 3 comprises a Morgan circuit including a capacitor 43, a gate controlled rectifier 44, a saturable current transformer 45 having a square loop core characteristic, and a diode 46. Chopper 3 also includes a damping circuit which comprises a capacitor 118, resistors 119 and 120, and an inductance 47. A pair of diodes 121 and 122, in series arrangement in order to achieve a high voltage rating and connected across the damping circuit, allow the energy stored in inductor 47 to flow into capacitor 5 when rectifier 44 is nonconducting. A pair of capacitors 123 and 124 are connected across diodes 121 and 122 to provide for equal voltage division thereacross.

Generally speaking, chopper 3 is operative to produce pulses of current at a frequency equal to that of the voltage control pulses applied to rectifier 44, these current pulses being applied to charge up capacitor 5 through diode 46 and inductor 47. Storage capacitor 5 will thus charge up to a D.C. voltage whose magnitude is determined by the repetition frequency of the pulses produced by chopper 3 and applied thereto. The operation of the Morgan circuit referred to herein is described in more detail in the General Electric Silicon Controlled Rectifier Manual, Second Edition, pages 149–152, and hence is not further discussed herein.

Inverter 6, which includes gate controlled rectifiers 55 and 56, is operative to apply the D.C. voltage appearing across capacitor 5 alternately to portions 58 and 62 of the center-tapped primary winding 63 of resonant transformer 7. The commutating circuit portion of inverter 6 comprises a gate controlled rectifier 48, primary winding 49 of a pulse transformer 50, a capacitor 51 and a resistor 52.

Figure 5:
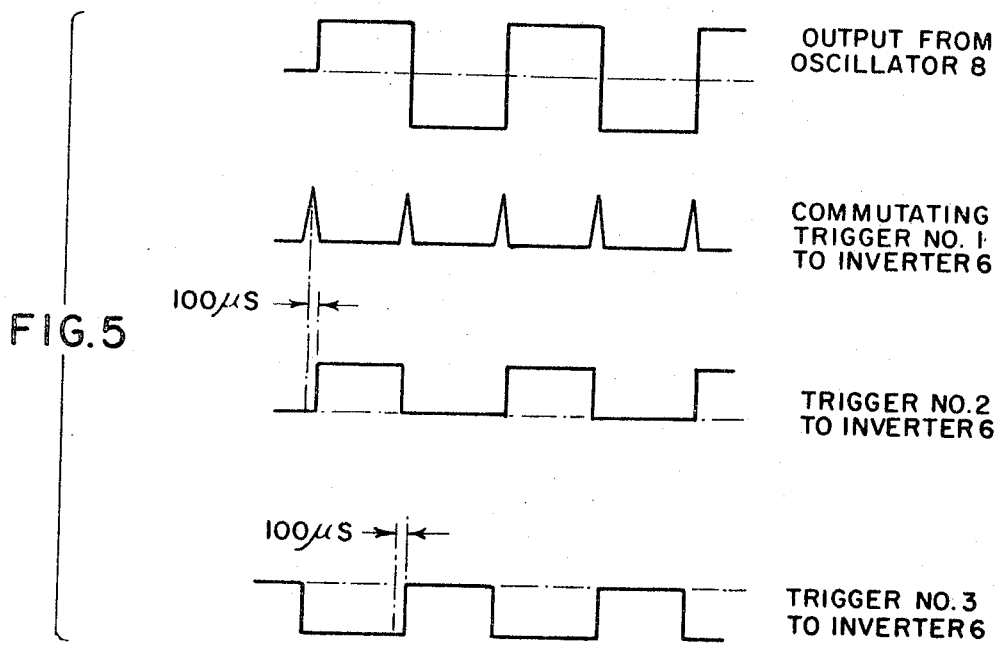
FIG. 5 is a diagram of waveforms occurring at various points in the circuits of FIGS. 2, 3, and 4.

The output waveforms of oscillator 8 and the trigger pulses Nos. 1, 2 and 3 produced by trigger circuit 42 are shown in FIG. 5.

Trigger pulse No. 1 is applied to gate 53 turning rectifier 48 "ON" and thereby producing a voltage pulse across windings 49 and 54 of pulse transformer 50. If gate controlled rectifiers 55 and 56 are in the nonconducting state at this instant in time, the pulse thus appearing across winding 54 will have no effect on the state of conduction of rectifiers 55 and 56. Rectifier 48 will remain in conduction for a period of time determined by capacitor 51 and the inductance of winding 49, and will turn "OFF" by self-commutation action. When trigger pulse No. 2 is applied to gate 57, as shown, rectifier 55 is turned "ON," and hence the D.C. potential produced across capacitor 5 by the action of chopper 3 is applied to winding portion 58 of primary winding 63. During the time of such application, because the impedance of winding 54 is very low, anode 59 is virtually clamped to ground potential and the voltage across capacitor 60 is very small. A subsequent trigger No. 1 pulse is applied to gate 53, again turning rectifier 48 "ON" and thereby producing a voltage pulse across winding 54. Since anode 59 is at ground potential at this point in time, the effect of the pulse thus produced across winding 54 is to back-bias rectifier 55 to turn it "OFF". After a suitable interval, e.g. 100 microseconds, as shown in FIG. 5, a trigger pulse No. 3 is applied to gate 61, turning rectifier 56 "ON" and thus applying the D.C. voltage stored on capacitor 5 across winding portion 62 of primary winding 63. The following trigger pulse No. 1 will similarly turn rectifier 56 "OFF," to complete the cycle.

Referring to FIG. 4, there is shown in schematic form, voltage regulator 4 comprising pulse generator 21, constant current source 22 and pulse amplifier 23. There is also shown circuit breaker 11 and voltage sensor 37 to illustrate how circuit protection is accomplished.

Voltage regulator 4 comprises a pulse generator 21 which includes a unijunction transistor 74, a timing capacitor 95 and pulse amplifier 23 including a transistor 98. Primary winding 100 of a pulse transformer 101 is connected in the collector circuit of transistor 98 and serves to apply the voltage control pulses produced thereacross, to rectifier 44 by means of winding 115 to thereby control the repetition rate of chopper 3.

Constant current source 22 comprises a transistor 96 connected in the common emitter configuration and serves as a source of charging current for timing capacitor 95.

Circuit breaker 11 comprises a pair of gate controlled rectifiers 69 and 76 and a coupling capacitor 91 which are operative as a flip-flop circuit such that at any instant of time either rectifier 69 or 76 is "ON." When rectifier 69 is "ON" the potential at anode 72 will be close to ground potential. Since anode 72 is connected to emitter 73 by lead 116 and diode 75, when anode 72 is at ground potential, emitter 73 will be clamped to ground potential, thus preventing unijunction transistor 74 from being turned "ON," and hence clamping the output of chopper 3. Rectifier 69 may be turned "ON" by the application of a trip signal thereto at gate 68. Such a trip signal may be provided by sensors 37, 38, 35 and 36 and may be applied to rectifier 69 by means of pulse transformers 113, 103 and 111 and whose secondary windings 112, 104 and 110 respectively, are connected to gate 68.

Sensor 37, comprising a unijunction transistor 117 having primary winding 102 of a pulse transformer 103 connected to a base electrode, is operative to produce a pulse across winding 102 whenever the resonant transformer output voltage, as indicated by the potential on a lead 114, exceeds a preselected level. The pulse thus produced across winding 102 constitutes the trip signal applied to gate 68 by means of winding 104.

Again referring to FIG. 4, the principles of operation of voltage regulator 4 and the circuit protection circuitry comprising circuit breaker 11 will be described in more detail by considering the sequence of events in operation.

When A.C. power source 1 is energized, a D.C. supply voltage shown as B+ may be provided by any one of many well known techniques. When source 1 is so energized, current flows through a resistor 65, a diode 66 and a resistor 67 to produce a voltage on gate 68 of rectifier 69 to turn it "ON." Since rectifier 69 is now conductive and the potential drop across winding 70 of a pulse transformer 71 is negligibly small, anode 72 is clamped to ground potential. Emitter 73 of unijunction transistor 74 is connected to anode 72 through a diode 75, and hence emitter 73 will also be clamped to ground potential, thus preventing capacitor 95 from charging up to the trip level of unijunction transistor 74.

Because rectifiers 69 and 76 comprise a flip-flop circuit and rectifier 69 is "ON," rectifier 76 will be "OFF," and the potential on anode 77 will be close to B+. At this moment in time, capacitor 78 will be charged up to approximately B+ potential through the charging path comprising a resistor 65, a diode 79 and capacitor 78 to ground. The D.C. voltage across capacitor 78 will thus be applied to base 80 of transistor 81 through a resistor 82 and a diode 83, keeping transistor 81 and hence transistor 84, in saturation. Since collector 85 is connected through diode 86 to emitter 73 which, as pointed out above, is at ground potential, collector 85 will also be held at ground potential. The above description indicates the operating conditions of the circuit breaker and voltage regulator circuitry just before inverter 6 is started up to provide driving power to resonant transformer 7.

The following is a description of the series of events occurring when circuit breaker 11 is turned "ON," to permit the supply of power to drive transformer 7. Switches 87 and 88 are operative to render circuit breaker 11 "ON" and "OFF" respectively.

When "ON" switch 87 is manually depressed, current will flow through a resistor 89 to apply a potential to gate 90 of rectifier 76, thereby turning it "ON." Coupling capacitor 91, which until this point in time was charged to a potential of approximately B+, now discharges through the anode to cathode path of rectifier 76, turning rectifier 69 "OFF." The clamp to ground potential heretofore applied to emitter 73, by virtue of the conduction of rectifier 69, is now removed, since rectifier 69 is "OFF," and anode 72 is therefore at approximately B+ potential. However, since transistors 81 and 84 are in saturation, emitter 73 is still clamped to virtually ground potential through diode 86. The foregoing turn-"ON" action of rectifier 76 brings anode 77 down to approximately ground potential, thus applying a reverse bias on diode 79 and rendering it non-conductive. Capacitor 78, having a voltage of approximately B+ thereacross, starts to discharge through resistor 92 to ground, thereby reducing the potential on base 80 and bringing transistor 81 from a region of saturation to normal conduction. This change in the level of conduction in transistor 81 causes a corresponding shift in transistor 84 to the conduction region, thereby decreasing the current drain through diode 86 and hence increasing the pulse repetition frequency of unijunction transistor 74. The foregoing action will continue until the potential on base 80 becomes sufficiently positive with respect to the junction point of capacitor 78 and resistor 82. When this occurs, diode 83 will be reverse biased and hence "OFF," thereby isolating capacitor 78 from voltage regulator 4.

The voltage output of resonant transformer secondary winding 12 may be indicated by the potential on a lead 93. As the repetition rate of transistor 74 builds up, the potential on lead 93, reflecting the resonant transformer output voltage, will correspondingly increase, thereby increasing the potential on base 80 and hence causing the level of conduction of transistor 81 to rise. As a result, the potential on base 94, and hence the conduction level of transistor 84, will rise to correspondingly increase the drain of charging current from capacitor 95, through diode 86. The charging current for capacitor 95, and hence the repetition rate of unijunction transistor 74, is thereby maintained at the preselected level.

The pulses produced by unijunction transistor 74 are applied to base 97 of transistor 98 by means of capacitor 99 to be amplified by transistor 98. The output pulses of transistor 98 consequently produced across winding 100 of a pulse transformer 101 are applied to chopper 3 at rectifier 44 to control the repetition frequency of the pulse output of chopper 3.

The magnitude of the resonant transformer output voltage depends on the D.C. potential on capacitor 5 which is applied to inverter 6. This D.C. potential in turn depends on the repetition frequency of chopper 3 which is equal to the repetition frequency of transistor 74. Thus, the feedback circuitry of voltage regulator 4, by maintaining the repetition frequency of chopper 3, i.e., transistor 74, constant, is operative to maintain the output voltage of resonant transformer 7 constant at the preselected level.

*Over-voltage and over-current protection*

Circuit breaker 11 is operative to clamp the pulse output of trigger generator 21 being applied to chopper 3, while concurrently opening the circuit between rectifier circuit 2 and inverter 6, whenever the resonant transformer output exceeds a preselected level. Circuit breaker 11 comprises a gate controlled rectifier 107 and a capacitor 109. Upon the application of a trip pulse thereto by sensor 37, rectifier 107 is operative to apply a charge, accumulative on capacitor 109, across the cathode to anode terminals of rectifier 44 to thereby turn rectifier 44 "OFF." Since rectifier 44 controls the output of chopper 3, the output of chopper 3 will consequently be inhibited.

Sensor 37 which determines when the resonant transformer output voltage exceeds the preselected level, is operative as follows. If the potential on lead 114, which represents the resonant transformer output voltage, rises above the preselected level, the resulting rise in potential of emitter 175 will cause unijunction transistor 117 to fire, thus generating a pulse across winding 102 of pulse transformer 103. This voltage overload trip pulse is applied to gate 68 by means of winding 104 and diode 105, thus turning rectifier 69 "ON." A pulse across winding 70 is thereby produced, which is applied to gate 106 of rectifier 107 by means of winding 108, thereby turning rectifier 107 "ON." Since rectifier 107 is now "ON," the potential across capacitor 109 is applied to back-bias gate controlled rectifier 44 turning it "OFF," and hence interrupting the pulse output of chopper 3. At the same time, since anode 72 is connected to emitter 73 through diode 75, emitter 73 is clamped to virtually ground potential, thus inhibiting the supply of pulses from trigger generator 21 to chopper 3.

Sensor 38 is operative, in a manner similar to that described above for sensor 37, to generate an overload current trip pulse when the current through X-ray tube 10 exceeds a preselected level. This trip pulse is applied to winding 110 of pulse transformer 111 and serves to interrupt the pulse output of chopper 3 while simultaneously inhibiting the current control pulses applied by tripper generator 28 to trigger circuit 31.

Sensors 35 and 36, which protect inverter 6 from excess D.C. voltage and current, are similarly operative to trigger rectifier 69 "ON" by means of winding 112 of pulse transformer 113, thus interrupting the pulse output of chopper 3 while concurrently clamping the output of trigger generators 21 and 28.

Circuit breaker 11 may be triggered manually by depressing "OFF" switch 88. This action applies a positive potential to gate 68 thereby turning rectifier 69 "ON," and, of course, producing the same sequence of events described above, to interrupt the output of chopper 3.

While the invention has been described by reference to a particular embodiment thereof, it will be understood that numerous modifications may be made by those skilled in the art without departing from the invention and it is, therefore, aimed in the appended claims to cover all such equivalent variations as fall within the true spirit and scope of the invention.

What is claimed as new and desired to be secured by Letters Patent of the United States is:

1. A power source for a transformer comprising:
   (a) a D.C. source,
   (b) capacitor means of sufficient capacity to supply the load current and load voltage requirements of the transformer, (c) a controlled rectifier chopper switching means constituting a D.C.-to-D.C. converter means connected between the source and the capacitor means for charging the capacitor means to a selectively variable D.C. potential that depends on the conduction frequency of the switching means, (d) oscillator means operative to produce pulses at a preselected reference frequency and including a feedback circuit from the transformer for maintaining the oscillator frequency in a predetermined relationship with the desired operating frequency of the transformer, (e) inverter means operative in response to said oscillator pulses to deliver electric pulses from the capacitor means to a transformer at the instantaneous potential of the capacitor means and at a frequency dependent on the reference frequency of the oscillator, (f) voltage regulator means operative to determine the output voltage of said transformer and to control variably the conduction frequency of the controlled rectifier chopper switching means in dependence on the determined voltage whereby to control the D.C. potential on the capacitor in accordance with the deviation from said determined voltage.

2. In combination with apparatus as defined in claim 1, circuit protection means comprising voltage sensor means, current sensor means and interrupter means, said interrupter means being operative in response to said voltage sensor means and current sensor means to interrupt the supply of power provided by said converter means for said inverter means.

3. Apparatus as in claim 2 wherein said circuit protection means is operative independently of said voltage regulator means.

4. Apparatus as in claim 2 wherein said interrupter means is operative to interrupt the supply of power provided by said converter means for said inverter means when the output voltage of said converter means exceeds a predetermined level.

5. Apparatus as in claim 2 wherein said interrupter means is operative to interrupt the supply of power provided by said converter means for said inverter means when the current output of said converter means exceeds a predetermined level.

6. Apparatus as in claim 2 wherein said interrupter means is operative to interrupt the supply of power provided by said converter means for said inverter means when the output voltage of said transformer exceeds a predetermined level.

7. Apparatus as in claim 2 wherein said interrupter means is operative to interrupt the supply of power provided by said converter means for said inverter means when said inverter means faults in operation.

8. Apparatus as defined in claim 2 wherein said chopper switching means comprises switching means concurrently operative in response to said voltage regulator means to control said selectively variable D.C. potential and in response to said interrupter means to interrupt the supply of power provided by said converter means for said inverter means.

9. Apparatus as defined in claim 2 wherein said interrupter means comprises, a gate controlled rectifier having gate, cathode and anode electrodes, a resistor connected to said anode, means for connecting the outputs of said voltage sensor means and current sensor means to said gate electrode, said connecting means comprising a transformer having primary and secondary windings, said primary winding being connected to said cathode and said secondary winding being connected to said chopper means, said gate controlled rectifier being operative in response to said voltage sensor means and said current sensor means.

10. The invention set forth in claim 1 including:
(a) an electron tube having an emitting electrode and accelerating electrodes,
(b) a transformer secondary winding connected to said electrodes,
(c) a current regulator means for controlling the tube current of said electron tube, said tube current being established by the emission characteristics of said emitting electrode and the potential applied to said accelerating electrodes by said transformer secondary winding,
(d) said current regulator means being operative to produce pulses of current in said emitting electrode at a frequency determined by the deviation of said determined tube current from a preselected level to thereby control said tube current.

11. Apparatus as in claim 10 in combination with circuit protection means which is operative to interrupt the supply of power provided by said converter means for said inverter means when said tube current exceeds a predetermined level.

References Cited by the Examiner

UNITED STATES PATENTS

| | | | |
|---|---|---|---|
| 2,497,908 | 2/1950 | Philpott | 321—16 |
| 2,627,035 | 1/1953 | Ball | 250—103 X |
| 2,951,947 | 9/1960 | Boeker | 250—103 |
| 2,959,725 | 11/1960 | Younkin | 321—45 X |
| 3,237,081 | 2/1966 | Martin | 321—18 |

FOREIGN PATENTS 936,253  9/1963  Great Britain.

JOHN W. HUCKERT, *Primary Examiner.*

D. O. KRAFT, R. F. POLISSACK, *Assistant Examiners.*